United States Patent
Komai

(10) Patent No.: US 6,736,347 B2
(45) Date of Patent: *May 18, 2004

(54) MAGNETIC TAPE CUTTING SYSTEM AND METHOD

(75) Inventor: Hirokazu Komai, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 85 days.

This patent is subject to a terminal disclaimer.

(21) Appl. No.: 10/102,927

(22) Filed: Mar. 22, 2002

(65) Prior Publication Data

US 2002/0134878 A1 Sep. 26, 2002

(30) Foreign Application Priority Data

Mar. 26, 2001 (JP) ...................................... P.2001-087840

(51) Int. Cl.[7] .............................................. B65H 19/26
(52) U.S. Cl. .................. 242/523.1; 242/534; 242/534.2
(58) Field of Search ............................. 242/523.1, 534, 242/534.2

(56) References Cited

U.S. PATENT DOCUMENTS

| 4,632,335 A | * | 12/1986 | Dickson et al. | ............. 242/534 |
| 4,679,744 A | * | 7/1987 | Chikamasa et al. | ......... 242/534 |
| 4,894,733 A | * | 1/1990 | Odaka | ......................... 360/31 |
| 5,513,818 A | * | 5/1996 | Wada et al. | ............. 242/532.1 |

FOREIGN PATENT DOCUMENTS

| JP | 63-228483 | 9/1988 |
| JP | 5-36232 | 2/1993 |
| JP | 6-23432 | 2/1994 |
| JP | 7-37362 | 2/1995 |

* cited by examiner

*Primary Examiner*—Kathy Matecki
*Assistant Examiner*—Sang Kim
(74) *Attorney, Agent, or Firm*—Sughrue Mion, PLLC

(57) ABSTRACT

A magnetic tape cutting system having a storage unit for storing positional information of defect portions of a whole roll of magnetic tape and a winding apparatus for playing out magnetic tape from the roll and winding the magnetic tape as a product. A defect removal apparatus plays out magnetic tape from the whole roll for purposes of disposal. A control unit selects, based on the positional information of the defect portions in a selected roll of magnetic tape, the winding apparatus or the defect removal apparatus. The apparatus that is not currently selected is available to process another roll of magnetic tape while the selected roll of magnetic tape is being processed in the selected apparatus.

8 Claims, 2 Drawing Sheets

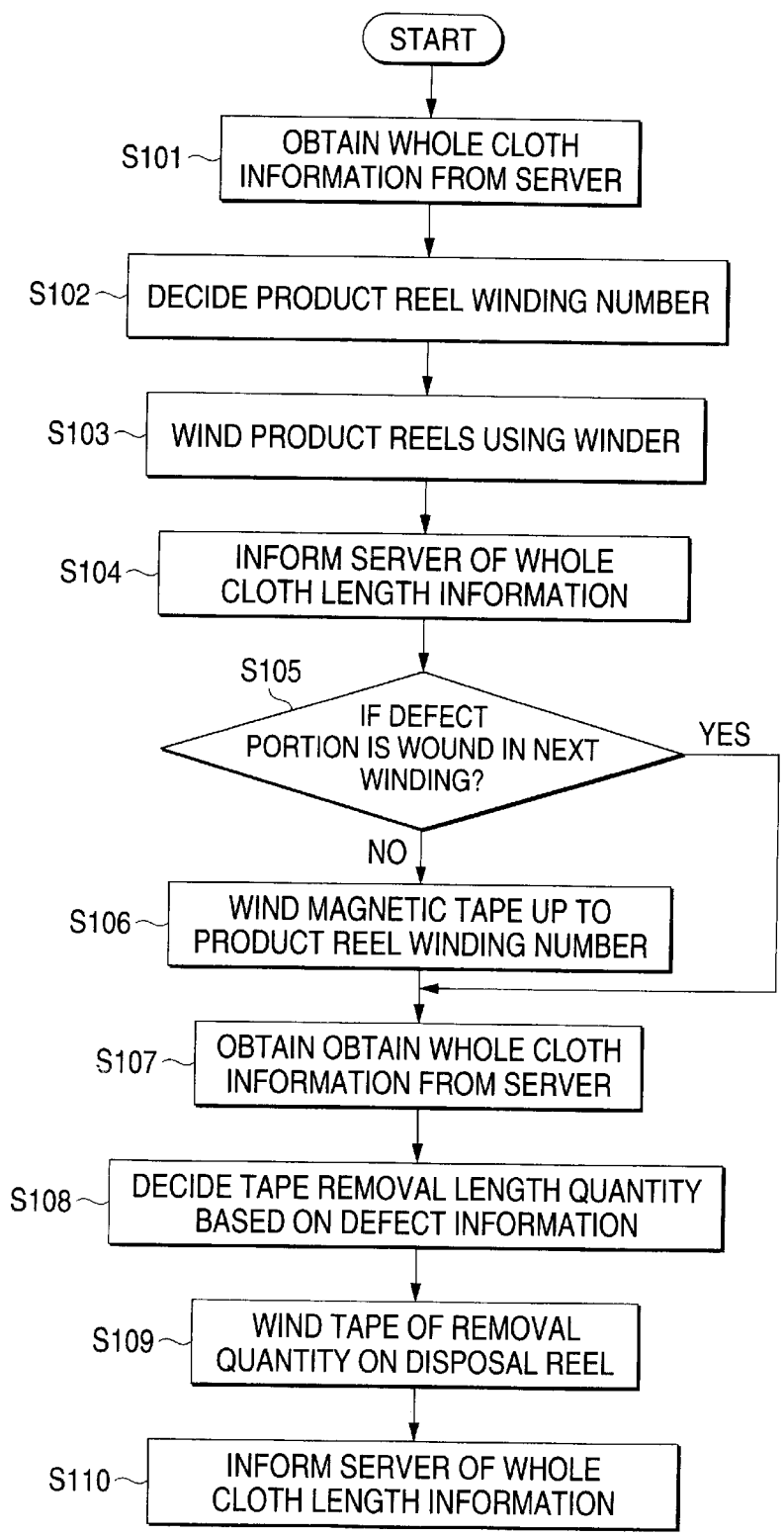

MAGNETIC TAPE CUTTING SYSTEM AND METHOD

BACKGROUND OF THE INVENTION

The present invention relates to a magnetic tape cutting system that cuts off the magnetic tape from a magnetic tape roll, takes up a normal portion of the magnetic tape as a product, and removes the defective portion of the magnetic tape.

In the magnetic tape, when magnetic material is applied to a support body for forming the magnetic tape, in some cases, a dust sticks to the magnetic material thereby such as an uneven of the magnetic material is given, which causes a defect in the magnetic tape. Therefore, in a stage of forming the roll, the magnetic tape is checked as to whether a defect is present or not.

In a case of a magnetic tape which is used as a data backup, a servo signal is previously recorded in the magnetic tape. In such magnetic tape, the wrong writing of the servo signal can also give a defect, and therefore, the magnetic tape is checked for the presence or absence of a defect caused by a servo signal recorded therein.

As a magnetic tape cutting system of the above type, there is known an apparatus disclosed in JP-A-7-37362. In this magnetic tape cutting system, from a roll with a defect position of a magnetic tape previously recognized by inspection, a magnetic tape with a predetermined length for a product is cut off and is then taken up around a reel disposed within a cassette.

According to this apparatus, the defect position is recognized and stored by a storage unit. In case where no defect is present in the magnetic tape with the predetermined length to be cut off, the magnetic tape with the predetermined length is taken up around a reel (specifically, a product reel) disposed within the cassette. On the other hand, in case where a defect is present in the magnetic tape with the predetermined length to be cut off, the magnetic tape with the predetermined length is taken up around a disposal reel so that the magnetic tape having the defect can be disposed. Take-up of the magnetic tape on the product reel and take-up of the magnetic tape on the disposal reel are carried out within the same winding apparatus (winder).

In the interior of the above winding apparatus, there are provided a mechanism for taking up a magnetic tape on a product reel, a mechanism for taking up a magnetic tape on a disposal reel, and a mechanism for guiding a magnetic tape played out from a roll to either the product reel or the disposal reel. However, this winding apparatus has very complicated internal structure, requires high costs for installation thereof, and is troublesome in the maintenance thereof. Also, during the time while the magnetic tape is being taken up on the disposal reel, the production of the magnetic tape is stopped, which provides an obstacle to a productivity increase.

SUMMARY OF THE INVENTION

It is an object of the present invention to provide a magnetic tape cutting system for eliminating the above drawbacks found in above the magnetic tape cutting system. Accordingly, it is an object of the present invention to provide a magnetic tape cutting system which can reduce its cost and is easy to handle.

In attaining the above object, according to the present invention, there is provided a magnetic tape cutting system, comprising: a storage unit for storing positional information of defect portions of a whole roll of magnetic tape; a winding apparatus for playing out a magnetic tape from the whole roll and winding the magnetic tape as a product; a defect removal apparatus for playing out a magnetic tape from the whole roll for disposal; and, a control unit, based on the positional information of the defect portions, selecting one of the winding apparatus and the defect removal apparatus in which the magnetic tape is played out from the whole roll.

Also, in attaining the above object, according to another aspect of the present invention, there is provided a magnetic tape cutting method, comprising the steps of storing positional information of defect portions of a whole roll of magnetic tape in a storage unit; taking up normal portions of a magnetic tape from the whole roll as a product, based on the positional information of the defect portions, by a winding apparatus; and removing the defect portions of the magnetic tape from the whole roll by a defect removal apparatus.

According to the above structure, the control means, based on the positional information of the defect portion stored in the storage unit, selects as to whether the whole roll of magnetic tape is loaded into the winding apparatus or the defect removal apparatus. Then, the magnetic tape is then played out from the whole roll. The defect removal apparatus is separately disposed from the winding apparatus. Since the winding apparatus according to the present invention may have neither a function to take up the magnetic tape on the disposal reel nor a function to guide the magnetic tape played out from the whole roll to either of the product reel or disposal reel, the winding apparatus is simple in structure. Also, the structure of the defect removal apparatus can also be simplified. Therefore, the installation cost of the magnetic tape cutting system can be reduced. Also, the magnetic tape cutting system is easy in maintenance and is also easy to handle.

It may seem that separate disposal of the defect removal apparatus and winding apparatus can lower the yield rate. However, thanks to the recent progress in the communication technology, information sharing among a plurality of apparatus can be realized easily. The inventors have paid special attention to this and have found out the following fact. That is, in case where a defect removal apparatus separately disposed from the winding apparatus is used and information is properly shared between them, the productivity can be maintained or enhanced.

On the other hand, in case where the defect removal apparatus and the winding apparatus are disposed within the same apparatus, the production is stopped during the execution of the defect removal, which lowers the productivity.

However, according to the present invention, for example, with reference to the positional information of the defect portion stored in the storage unit, a predetermined length of magnetic tape is played out from the whole roll and is then taken up as a product by the winding apparatus. Then, the play-out of the magnetic tape is stopped at the vicinity of the defect portion and the magnetic tape is cut off from the product. Next the cut-off roll is moved to the defect removal apparatus, and the defect portion of the magnetic tape can be removed by the defect removal apparatus. After the defect portion is removed from the roll by the defect removal apparatus, this roll can be moved again to the winding apparatus. In this case, there is no restriction that the winding apparatus must be one used in the previous time, that is, the roll can be used to any of winding apparatuses.

The movement of the whole cloth between the winding apparatus and defect removal apparatus can be transferred by transfer means (automatic means) such as a robot; however, this is not limitative but the movement of the roll may also be transferred by hand.

DETAILED DESCRIPTION OF THE PREFERRED EMBODIMENT

Figure 1:
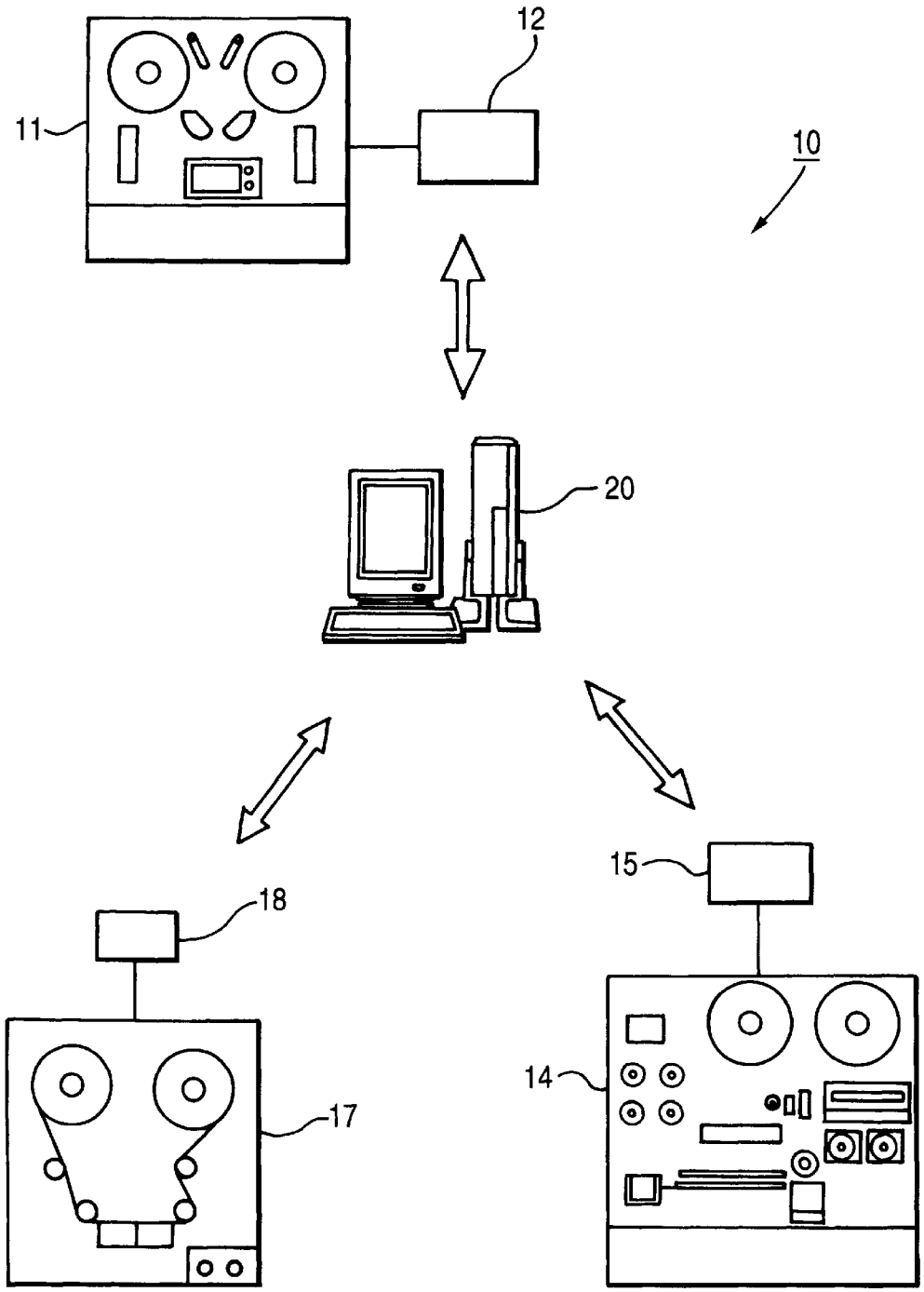
FIG. 1 is a conceptual view of an embodiment of a magnetic tape cutting system according to the present invention; and, FIG. 2 is a flow chart to explain the operation of the present embodiment.

Now, description will be given below of an embodiment of a magnetic tape cutting system according to the present invention with reference to the accompanying drawings.

FIG. 1 is a structure view of a magnetic tape cutting system 10 which is an embodiment according to the present invention. The present system 10 comprises a servo writer (servo signal writer apparatus) 11 having a check function, a winder (winding apparatus) 14, and a defect removal apparatus 17. These apparatus 11, 14, 17 are respectively connected to a server 20 through LAN cables by network connection in such a manner that they are able to communicate with one another. As the server 20, for example, a PC server which is composed of a personal computer may be employed. By the way, the system of the network connection is not limited to the above-mentioned cable system but a radio system can also be employed.

The servo writer 11 functions also as a defect check apparatus. The servo writer 11 is controlled by a terminal 12 and includes a function to write a servo signal into a magnetic tape of a pancake (i.e., a roll), read the servo signal and check whether the servo signal is written properly or not. And, the servo writer 11 transmits the positional information of the defective portion, where the servo signal is not written properly, to the server 20 through the terminal 12 and records it.

Also, the servo writer 11 and terminal 12 inform the server 20 of length information in the respective pancakes. As the length information, there can be employed, for example, information of number of blocks which shows the length from the start end of the magnetic tape to the terminal end thereof, when the magnetic tape of the pancake is divided into a plurality of small blocks such as a block 1, a block 2, a block 3, . . . and a block N in the longitudinal direction thereof. The above-mentioned positional information of defect portion can be informed to the server 20, for example, in the form that a defect is present in the block N.

Also, from the servo writer 11 and terminal 12, identification numbers (serial numbers) are informed to the server 20. The identification numbers are used to identify the respective ones from a plurality of pancakes into which servo signals have been written sequentially by the servo writer 11. These identification data can be displayed on the respective pancakes, for example, in the form of bar code information or two dimensional code information.

In this manner, the positional information of the defect portion data of the respective pancakes are previously shared by a plurality of apparatus 11, 14, 17 through the server 20.

The winder 14, which is controlled by a terminal 15, winds the normal portion of the magnetic tape, for example, on a reel mounted within the cassette arranged in the interior of the magnetic tape cutting system. The terminal 15 obtains the above positional information of the defect portion from the server 20 and also informs the server 20 of the information data on the states of the pancakes within the winder 14.

However, the winder 14 may not have the defect removal function.

The defect removal apparatus 17, which is controlled by a terminal 18, winds the defective portion of the magnetic tape and the margin portions of the magnetic tape existing in the front and rear portions of the defective portion, for example, on a disposal reel arranged in the interior of the magnetic tape cutting system. The terminal 18 obtains the positional information of the defect portion from the server 20 and also informs the server 20 of the information data on the states of the pancakes within the defect removal apparatus 17.

Now, description will be given below of an example of the operation of the magnetic tape cutting system 10 with reference to FIGS. 1 and 2.

Firstly, in a state where a pancake transferred from the servo writer 11 is loaded into the winder 14, the terminal 15 refers to the identification number of the pancake and obtains the length information of the pancake and positional information of defect portion thereof from the server 20 (S101).

By the way, although not shown in FIG. 2, a pancake, which should firstly be processed by the defect removal apparatus 17, may be loaded directly into the defect removal apparatus 17 at first not through the winder 14.

Next, the terminal 15, based on the pancake information obtained, calculates the length thereof up to the leading defect position and decides the number of product reels to be able to wound at a size specified in the current production. That is, the terminal 15 decides product reel winding number (S102).

And, the winder 14 winds the product reels sequentially (S103); and, it cuts a magnetic tape from the thus-wound product and then feeds the product onto a conveyer (not shown).

Then, the pancake length information is informed to the server 20 through the terminal 15 (S104). That is, the information as to which block the magnetic tape has been played out is informed to the server 20, there by updating the pancake length information. This makes it possible to prevent the positional information of defect portion left in the pancake from being lost. By the way, although not shown in FIG. 2, even in the case of abnormal stop such as the down of the system, the length information at the time is informed to the server 20.

At the time when the length information is updated, it is checked whether a defect is preset or not in the length composed of the sum of the length of the magnetic tape to be produced at the time in addition to the margin portions thereof (S105) If no defect is present, then the magnetic tape is wound up to the product reel winding number (S106). If a defect is present, even in case where the winding number of the magnetic tape has not reached the product reel winding number, the winding of the magnetic tape is stopped.

Next, in a state where a pancake is moved to and loaded into the defect removal apparatus 17, the terminal 18 refers to the identification number of the pancake to thereby obtain the length information of the pancake and the positional information of the defect portion thereof from the server 20 (S107).

By the way, although not shown in FIG. 2, in the case of a pancake in which the remaining quantity of the magnetic tape is small, it may not be moved to the defect removal apparatus 17 but may be disposed itself. Or, at the time when pancakes are loaded into the defect removal apparatus 17, the remaining quantities of the magnetic tapes in the pancakes may be checked and, in the case of the pancakes in which the remaining quantities of the magnetic tapes are small, they may be disposed.

Next, the terminal 18, based on the pancake information obtained, decides the length of the magnetic tape to be removed (S108).

And, the defect removal apparatus 17 winds a magnetic tape of such removal quantity on the disposal reel (S109), and this magnetic tape is then cut off from the disposal reel.

Then, the pancake length information is informed to the server 20 through the terminal 18 (S110).

And, the pancake with its defect portion removed is loaded again into the winder 14 at a proper timing and, after then, the above procedures (from S101 to S110) are repeated.

By the way, for convenience of explanation, although the operation of the magnetic tape cutting system has been described in the time series manner, the servo writer 11, winder 14 and defect removal apparatus 17 operate in parallel and thus they should be controlled in the following manner: that is, for example, the server 20 may give commands to the respective apparatus to thereby control them in such a manner that the magnetic tape cutting system can operate most efficiently.

According to the above-described magnetic tape cutting system 10, since the information of the respective apparatus is shared by and among the respective apparatus, the respective apparatus can be operated with good efficiency, with the result that the yield rate can be enhanced. As the winder 14 and the defect removal apparatus 17, there can be employed an apparatus which is simple in structure, for example, an inexpensive apparatus or an old-fashioned apparatus. The reason for this is that a plurality of apparatus are arranged into a single system through the network connection to thereby be able to reduce the burdens of the respective apparatus.

By the way, the present invention is not limited to the above-described embodiment but proper changes and improvements are also possible without departing from the scope and spirit of the present invention.

For example, instead of the servo signal writing defect position being used as the positional information of the defect portion, the defect position of the uneven magnetic material application found through the examination of the magnetic material application state can be used as the positional information of the defect portion, or both of them can be used as the positional information of the defect portion.

Also, when an operator finds a defect which is not stored in the server, the operator may manually remove such defect portion and update the data accordingly.

As has been described heretofore, according to the present invention, there can be supplied a magnetic tape cutting system which can reduce its cost and is easy to handle.

What is claimed is:

1. A magnetic tape cutting system, comprising:

a storage unit for storing positional information of defect portions of a plurality of rolls of magnetic tape;

a winding apparatus for playing out magnetic tape from one of the plurality of rolls and winding the magnetic tape as a product;

a defect removal apparatus for playing out magnetic tape from one of the plurality of rolls for disposal of the defect portions; and, a control unit that, based on the positional information of the defect portions in a selected roll from the plurality of rolls, selects one of the winding apparatus and the defect removal apparatus in which the magnetic tape played out from the selected roll is either wound as a product or disposed of, respectively, wherein the apparatus that is not processing the selected roll is available to concurrently process another roll from the plurality of rolls.

2. The magnetic tape cutting system as set forth in claim 1, wherein the defect removal apparatus is separately disposed from the winding apparatus.

3. The magnetic tape cutting system as set forth in claim 1, wherein the storage unit, the winding apparatus and the defect removal apparatus are respectively connected to the control unit through LAN cables by network connection.

4. The magnetic tape cutting system as set forth in claim 1, wherein the storage unit, the winding apparatus and the defect removal apparatus communicate to the control unit by radio.

5. A magnetic tape cutting method, comprising the steps of:

storing positional information of defect portions of a plurality of rolls of magnetic tape in a storage unit;

for a selected roll from the plurality of rolls, selecting one of a winding apparatus and a defect removal apparatus based on the positional information of the defect portions in the selected roll;

taking up normal portions of magnetic tape from the selected roll as a product, based on the positional information of the defect portions of the selected roll, by the winding apparatus; and, removing the defect portions of magnetic tape from the selected roll by defect removal apparatus, wherein the apparatus that is not processing the selected roll of the plurality of rolls is available to concurrently process another roll from the plurality of rolls.

6. The magnetic tape cutting method as set forth in claim 5, wherein the defect removal apparatus is separately disposed from the winding apparatus.

7. The magnetic tape cutting method as set forth in claim 5, wherein the storage unit, the winding apparatus and the defect removal apparatus are connected to a control unit through LAN cables by network connection.

8. The magnetic tape cutting method as set forth in claim 5, wherein the storage unit, the winding apparatus and the defect removal apparatus communicate to a control unit by radio.

* * * * *